(12) United States Patent
Tzikas et al.

(10) Patent No.: US 6,537,332 B1
(45) Date of Patent: Mar. 25, 2003

(54) REACTIVE COLORANTS, MIXTURES OF REACTIVE COLORANTS AND PRODUCTION AND USE THEREOF

(75) Inventors: Athanassios Tzikas, Pratteln (CH); Herbert Klier, Efringen-Kirchen (DE)

(73) Assignee: Ciba Speciality Chemicals Corporation, Tarrytown, NY (US)

( * ) Notice: Subject to any disclaimer, the term of this patent is extended or adjusted under 35 U.S.C. 154(b) by 0 days.

(21) Appl. No.: 09/744,487

(22) PCT Filed: Jul. 15, 1999

(86) PCT No.: PCT/EP99/05020
§ 371 (c)(1),
(2), (4) Date: Jan. 24, 2001

(87) PCT Pub. No.: WO00/06652
PCT Pub. Date: Feb. 10, 2000

(30) Foreign Application Priority Data

Jul. 27, 1998 (EP) .............................................. 98810722

(51) Int. Cl.$^7$ ..................... C09B 62/475; C09B 62/513; C09B 62/01; C09B 67/22; D06P 1/384; D06P 3/66

(52) U.S. Cl. ......................... 8/549; 8/641; 8/918; 8/924

(58) Field of Search ................................. 534/637, 612; 8/641, 549, 918, 924

(56) References Cited

U.S. PATENT DOCUMENTS 5,684,138 A  11/1997  Klier et al. ................... 534/612
6,011,140 A  1/2000  Zamponi et al. ............. 534/637

FOREIGN PATENT DOCUMENTS

JP     08-060017    *    3/1996

OTHER PUBLICATIONS

Derwent Abstr. 98/208193/19 for DE 19640189 (1998).
Derwent Abstr. 96–295660 for JP 8127730 (1996).
Derwent Abstr. 95–380595 for JP 7258983 (1995).
Derwent Abstr. 95–371529 for JP 7252786 (1995).
Derwent Abstr. 91–114501 for JP 3056569 (1991).
Derwent Abstr. 90–005299 for JP 1289868 (1989).
Derwent Abstr. 88–274016 for JP 63199269 (Aug. 1988).

* cited by examiner

Primary Examiner—Margaret Einsmann
(74) Attorney, Agent, or Firm—Kevin T. Mansfield

(57) ABSTRACT

Dyes of formula (1)

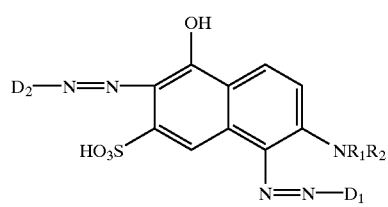

wherein $R_1$ and $R_2$ are each independently of the other hydrogen or $C_1$–$C_4$alkyl, and $D_1$ and $D_2$ are each independently of the other a radical of formula (2)

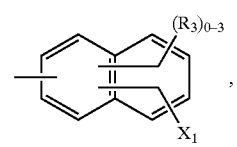

wherein $(R_3)_{0-3}$ denotes from 0 to 3 identical or different substituents selected from the group halogen, $C_1$–$C_4$alkyl, $C_1$–$C_4$alkoxy, carboxy, nitro and sulfo, and $X_1$ is a radical of formula (3a), (3b), (3c), (3d), (3e) or (3f)

—$SO_2$—Z (3a),

—NH—CO—$(CH_2)_m$—$SO_2$—Z (3b),

—CONH—$(CH_2)_n$—$SO_2$—Z (3c),

—NH—CO—CH(Hal)-$CH_2$-Hal (3d),

—NH—CO—C(Hal)=$CH_2$ (3e)

or

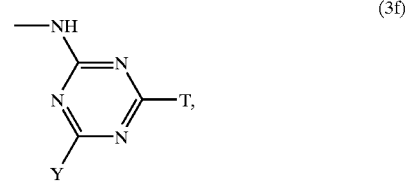

wherein

Y is halogen, T independently thereof has a meaning given for Y or is a non-fiber-reactive substituent or is a fiber-reactive radical of formula (4a), (4b), (4c), (4d) or (4e)

—NH—$(CH_2)_{2-3}$—$SO_2$—Z (4a),

—NH—$(CH_2)_{2-3}$—O—$(CH_2)_{2-3}$—$SO_2$—Z (4b),

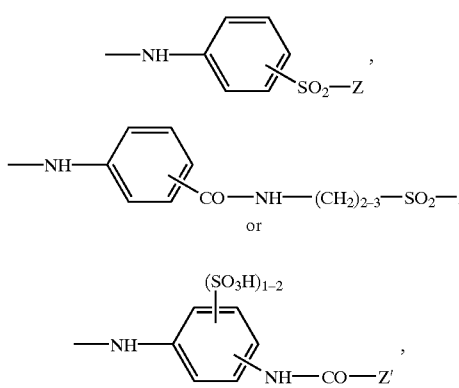

wherein
Z is vinyl or a radical —CH$_2$—CH$_2$—U and U is a group removable under alkaline conditions,
Z' is a group —CH(Hal)-CH$_2$-Hal or —C(Hal)=CH$_2$,
m and n are each independently of the other the number 2, 3 or 4, and
Hal is halogen, are suitable for dyeing a wide variety of fiber materials, especially cellulosic fiber materials, and yield dyeings having good allround properties.

10 Claims, No Drawings

REACTIVE COLORANTS, MIXTURES OF REACTIVE COLORANTS AND PRODUCTION AND USE THEREOF

The present invention relates to novel reactive colorants and mixtures of reactive colorants, to processes for their production and to their use.

The practice of dyeing using reactive dyes has recently led to higher demands being made of the quality of the dyeings and the profitability of the dyeing process. As a result, there is still a need for novel reactive dyes having improved properties, especially in respect of their application.

Dyeing nowadays requires reactive dyes that have sufficient substantivity and at the same time have good ease of washing off of unfixed dye. They should also have a good tinctorial yield and high reactivity, the objective being to provide especially dyeings having high degrees of fixing. The known dyes do not satisfy these requirements in all properties.

The problem underlying the present invention is accordingly to find, for the dyeing and printing of fibre materials, novel improved reactive dyes and mixtures of reactive dyes that possess the qualities characterised above to a high degree. The novel dyes and dye mixtures should especially be distinguished by high fixing yields and high fibre-dye binding stability; it should also be possible for dye that is not fixed to the fibre to be washed off easily. The dyes should also yield dyeings having good allround properties, for example fastness to light and to wetting.

It has been shown that the problem posed is largely solved by the novel dyes and dye mixtures defined below.

The present invention accordingly relates to dyes of formula (1)

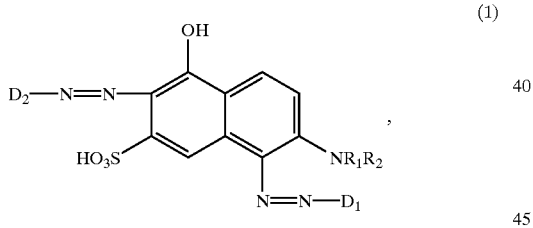

(1)

wherein $R_1$ and $R_2$ are each independently of the other hydrogen or $C_1$–$C_4$alkyl, and $D_1$ and $D_2$ are each independently of the other a radical of formula (2)

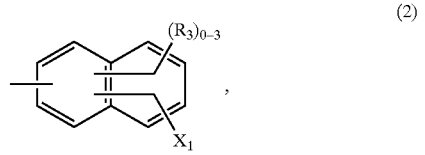

(2)

wherein $(R_3)_{0-3}$ denotes from 0 to 3 identical or different substituents selected from the group halogen, $C_1$–$C_4$alkyl, $C_1$–$C_4$alkoxy, carboxy, nitro and sulfo, and $X_1$ is a radical of formula (3a), (3b), (3c), (3d), (3e) or (3f)

—SO$_2$—Z (3a),

—NH—CO—(CH$_2$)$_m$—SO$_2$—Z (3b),

—CONH—(CH$_2$)$_n$—SO$_2$—Z (3c),

—NH—CO—CH(Hal)—CH$_2$—Hal (3d),

—NH—CO—C(Hal)=CH$_2$ (3e) or

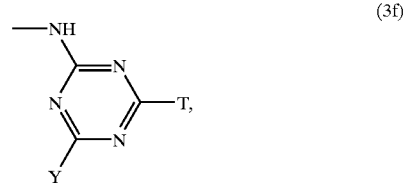

(3f)

wherein

Y is halogen, T independently thereof has a meaning given for Y or is a non-fibre-reactive substituent or is a fibre-reactive radical of formula (4a), (4b), (4c), (4d) or (4e)

—NH—(CH$_2$)$_{2-3}$—SO$_2$—Z (4a),

—NH—(CH$_2$)$_{2-3}$—O—(CH$_2$)$_{2-3}$—SO$_2$—Z (4b),

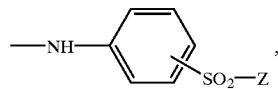

(4c)

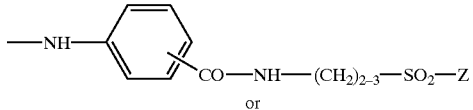

or (4d)

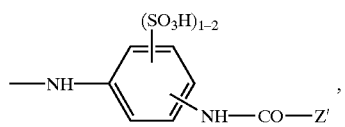

(4e)

wherein

Z is vinyl or a radical —CH$_2$—CH$_2$—U and U is a group removable under alkaline conditions, Z' is a group —CH(Hal)—CH$_2$—Hal or —C(Hal)=CH$_2$, m and n are each independently of the other the number 2, 3 or 4, and Hal is halogen.

As $C_1$–$C_4$alkyl for $R_1$ and $R_2$, each independently of the other, there come into consideration, for example, methyl, ethyl, n-propyl, isopropyl, n-butyl, sec-butyl, isobutyl and tert-butyl, especially methyl and ethyl.

Preferably, one of the radicals $R_1$ or $R_2$ is hydrogen and the other is methyl or ethyl.

Special preference is given to $R_1$ and $R_2$ as hydrogen.

As halogen for $R_3$ there come into consideration, for example, fluorine, chlorine, bromine and iodine, preferably chlorine and bromine, and especially chlorine.

As $C_1$–$C_4$alkyl for $R_3$ there come into consideration, for example, methyl, ethyl, n-propyl, isopropyl, n-butyl, sec-butyl, isobutyl and tert-butyl, preferably methyl and ethyl, and especially methyl.

As $C_1$–$C_4$alkoxy for $R_3$ there come into consideration, for example, methoxy, ethoxy, n-propoxy, isopropoxy, n-butoxy, isobutoxy and tert-butoxy, preferably methoxy and ethoxy, and especially methoxy.

Preferably, T is a non-fibre-reactive substituent or is a fibre-reactive radical of formula (4a), (4b), (4c), (4d) or (4e).

If T is a non-fibre-reactive substituent, it may be, for example, hydroxy; $C_1$–$C_4$alkoxy; unsubstituted or hydroxy-, carboxy- or sulfo-substituted $C_1$–$C_4$alkylthio; amino; amino mono- or di-substituted by $C_1$–$C_8$alkyl, wherein the alkyl is unsubstituted or is further substituted, e.g. by sulfo, sulfato, hydroxy, carboxy or by phenyl, especially by sulfo or by hydroxy and is uninterrupted or interrupted by an —O— radical; cyclohexylamino; morpholino; N—$C_1$–$C_4$alkyl-N-phenylamino or phenylamino or naphthylamino, wherein the phenyl or naphthyl is unsubstituted or substituted, e.g. by $C_1$–$C_4$alkyl, $C_1$–$C_4$alkoxy, carboxy, sulfo or by halogen.

Examples of suitable non-fibre-reactive substituents T include amino, methylamino, ethylamino, β-hydroxyethylamino, N-methyl-N-β-hydroxyethylamino, N-ethyl-N-β-hydroxyethylamino, N,N-di-β-hydroxyethylamino, β-sulfoethylamino, cyclohexylamino, morpholino, 2-, 3- or 4-chlorophenylamino, 2-, 3- or 4-methylphenylamino, 2-, 3- or 4-methoxyphenylamino, 2-, 3- or 4-sulfophenylamino, disulfophenylamino, 2-, 3- or 4-carboxyphenylamino, 1- or 2-naphthylamino, 1-sulfo-2-naphthylamino, 4,8-disulfo-2-naphthylamino, N-ethyl-N-phenylamino, N-methyl-N-phenylamino, methoxy, ethoxy, n- or iso-propoxy and hydroxy.

As non-fibre-reactive radical, T is preferably $C_1$–$C_4$alkoxy, unsubstituted or hydroxy-, carboxy- or sulfo-substituted $C_1$–$C_4$alkylthio, hydroxy, amino, N-mono- or N,N-di-$C_1$–$C_4$-alkylamino unsubstituted or substituted in the alkyl moiety by hydroxy, sulfato or by sulfo, morpholino, or phenylamino or N—$C_1$–$C_4$alkyl-N-phenylamino (wherein the alkyl is unsubstituted or substituted by hydroxy, sulfo or by sulfato) wherein the phenyl ring is in each case unsubstituted or substituted by sulfo, carboxy, acetylamino, chlorine, methyl or by methoxy, or naphthylamino unsubstituted or substituted by from 1 to 3 sulfo groups.

Especially preferred non-fibre-reactive radicals T are amino, N-methylamino, N-ethylamino, N-β-hydroxyethylamino, N-methyl-N-β-hydroxyethylamino, N-ethyl-N-β-hydroxyethylamino, N,N-di-β-hydroxyethylamino, β-sulfoethylamino, morpholino, 2-, 3- or 4-carboxyphenylamino, 2-, 3- or 4-sulfophenylamino or N—$C_1$–$C_4$alkyl-N-phenylamino.

In the case of the fibre-reactive radicals T of formulae (4a) and (4b), Z is preferably β-chloroethyl. In the case of the fibre-reactive radicals T of formulae (4c) and (4d), Z is preferably vinyl or β-sulfatoethyl.

If T is a fibre-reactive radical, T is preferably a radical of formula (4c) or (4d), and especially of formula (4c).

Hal in the fibre-reactive radicals of formulae (3d), (3e) and (4e) is preferably chlorine or bromine, especially bromine.

Y in the fibre-reactive radical of formula (3f) is, for example, fluorine, chlorine or bromine, preferably fluorine or chlorine, and especially chlorine.

As a leaving group U there come into consideration, for example, —Cl, —Br, —F, —OSO$_3$H, —SSO$_3$H, —OCO—CH$_3$, —OPO$_3$H$_2$, —OCO—C$_6$H$_5$, —OSO$_2$—C$_1$–C$_4$alkyl and —OSO$_2$—N(C$_1$–C$_4$alkyl)$_2$. U is preferably a group of formula —Cl, —OSO$_3$H, —SSO$_3$H, —OCO—CH$_3$, —OCO—C$_6$H$_5$ or —OPO$_3$H$_2$, especially —Cl or —OSO$_3$H, and more especially —OSO$_3$H.

Examples of suitable radicals Z accordingly include vinyl, β-bromo- or β-chloroethyl, β-acetoxyethyl, β-benzoyloxyethyl, β-phosphatoethyl, β-sulfatoethyl and β-thiosulfatoethyl. Z is preferably vinyl, β-chloroethyl or β-sulfatoethyl.

$D_1$ and $D_2$ preferably are each independently of the other a radical of formula (2a), (2b), (2c), (2d) or (2e)

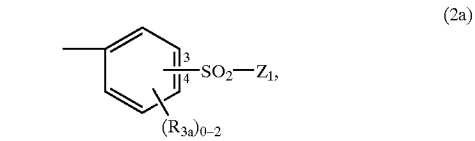

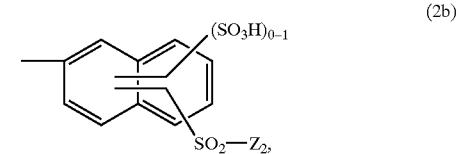

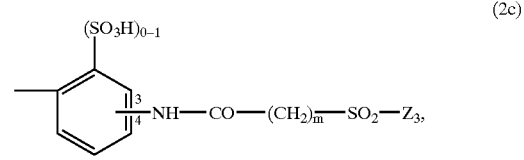

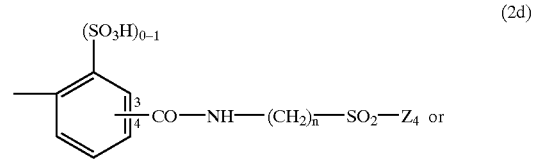

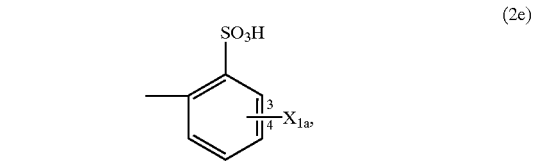

especially of formula (2a) or (2e), wherein ($R_{3a}$)$_{0-2}$ denotes from 0 to 2 identical or different substituents selected from the group halogen, $C_1$–$C_4$alkyl, $C_1$–$C_4$alkoxy and sulfo, especially methyl, methoxy and sulfo, $X_{1a}$ is α,β-dibromopropionylamino or α-bromoacryloylamino, m is the number 2 or 3, especially 3, n is the number 2 or 3, especially 2, and $Z_1$, $Z_2$, $Z_3$ and $Z_4$ are each independently of the others vinyl, β-chloroethyl or β-sulfatoethyl.

$Z_1$ and $Z_2$ are preferably each independently of the other vinyl or β-sulfatoethyl.

$Z_3$ is preferably β-chloroethyl or β-sulfatoethyl, especially β-chloroethyl.

$Z_4$ is preferably β-chloroethyl or β-sulfatoethyl, especially β-sulfatoethyl.

Preference is given to dyes of formula (1) wherein $D_1$ and $D_2$ are each independently of the other a radical of formula (2a), (2b), (2c), (2d) or (2e), preferably of formula (2a) or (2e), and $R_1$ and $R_2$ are hydrogen.

The radicals $D_1$ and $D_2$ in the dyes of formula (1) are identical or not identical.

The present invention relates also to a process for the preparation of dyes of formula (1), wherein (i) approximately 1 molar equivalent of an amine of formula (5a)

— (5a)

is diazotised in customary manner and reacted with approximately 1 molar equivalent of a compound of formula (6)

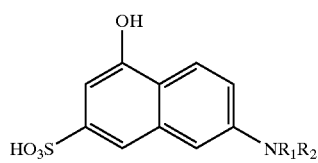
(6)

to form the compound of formula (7a)

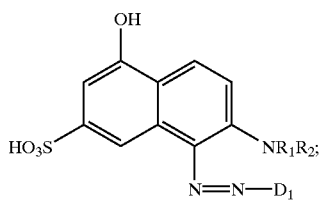
(7a)

and (ii) approximately 1 molar equivalent of an amine of formula (5b)

$D_2-NH_2$ (5b)

is diazotised in customary manner and reacted with approximately 1 molar equivalent of the compound of formula (7a) obtained according to (i), to form the compound of formula (1) wherein the definitions and preferred meanings given above for each of $D_1$, $D_2$, $R_1$ and $R_2$ apply.

The diazotisation of the amines of formulae (5a) and (5b) is carried out in a manner known per se, for example with a nitrite, e.g. with an alkali metal nitrite, such as sodium nitrite, in a mineral acid medium, e.g. in a hydrochloric acid medium, at temperatures of, for example, from −5 to 40° C., preferably from 0 to 20° C.

Coupling to the coupling components of formulae (6) and (7a) is carried out in a manner known per se, at acid, neutral or weakly alkaline pH values, for example at a pH value of from 0 to 8, and at temperatures of, for example, from −5 to 40° C., preferably from 0 to 30° C.

The first coupling (i) is effected in an acid medium, for example at a pH value of from 0 to 4, and the second coupling (ii) is effected at a higher pH value, in a weakly acid, neutral or weakly alkaline medium, for example at a pH value of from 4 to 8.

If the same procedure as described above is used, except that, instead of using 1 molar equivalent of an amine of formula (5a) and 1 molar equivalent of an amine of formula (5b), there are used in each of the process steps (i) and (ii) approximately 1 molar equivalent of a mixture of at least two, but preferably two, non-identical amines, for example a 1:1 molar mixture of the compounds of formulae (5a) and (5b), there are then obtained first, according to (i), a mixture of the compounds of formulae (7a) and (7b)

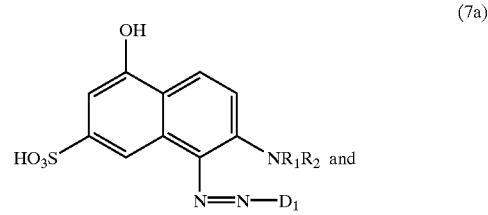
(7a)

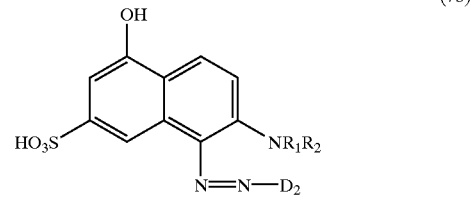
(7b)

and, on further reaction of the mixture of the compounds of formulae (7a) and (7b), according to (ii), a mixture of dyes of formulae (1a), (1b), (1c) and (1d)

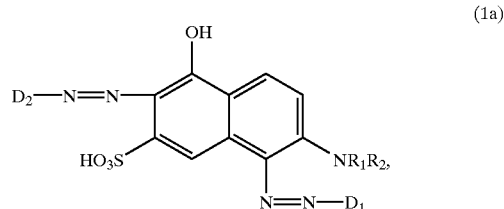
(1a)

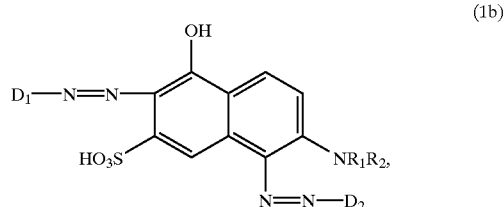
(1b)

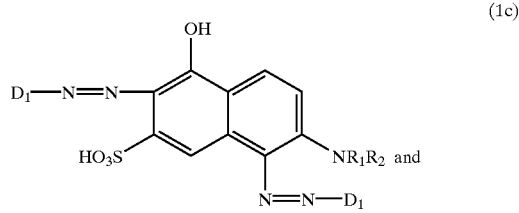
(1c)

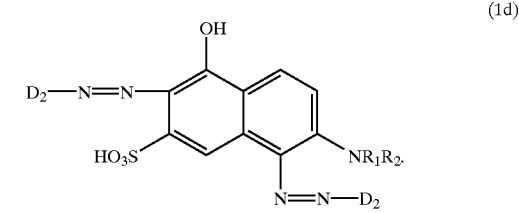
(1d)

The present invention accordingly relates also to dye mixtures comprising at least one dye of formulae (1a) and (1b) together with at least one dye of formulae (1c) and (1d), especially one dye of each of formulae (1a), (1b), (1c) and (1d), wherein the definitions and preferred meanings given above for each of $D_1$, $D_2$, $R_1$ and $R_2$ apply and $D_1$ and $D_2$ are not identical.

Preferably, in the dye mixtures according to the invention, $D_1$ is a radical of formula (2a*)

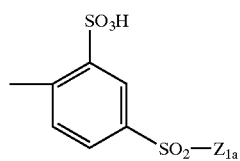
(2a*)

and D$_2$ is a radical of formula (2a**)

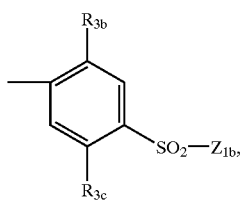
(2a**)

wherein

R$_{3b}$ and R$_{3c}$ are each independently of the other hydrogen, methyl or methoxy, especially hydrogen, and Z$_{1a}$ and Z$_{1b}$ are each independently of the other vinyl or β-sulfatoethyl, especially β-sulfatoethyl, and R$_1$ and R$_2$ are hydrogen.

The ratio of the dyes of formulae (1a), (1b), (1c) and (1d) in the mixture can vary within wide ranges and will depend upon the ratio of the amines D$_1$—NH$_2$ and D$_2$—NH$_2$ used according to each of (i) and (ii).

The dye mixtures mentioned above contain, for example, from 5 to 95% by weight, especially from 10 to 90% by weight, and more especially from 20 to 80% by weight, of a dye of formula (1a) and/or (1b), based on the total amount of the dyes of formulae (1a), (1b), (1c) and (1d) in the mixture.

The compounds of formulae (5a), (5b) and (6) are known or can be obtained in a manner known per se.

The present invention relates also to dye mixtures comprising at least one dye of formula (1) together with at least one dye of formula (8)

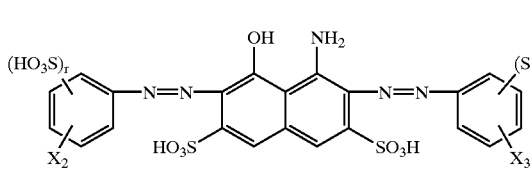
(8)

wherein r and s are each independently of the other the number 0 or 1 and

X$_2$ and X$_3$ are each independently of the other a radical of formula (3a), (3b), (3c) or (3d)

—SO$_2$—Z (3a),

—CONH—(CH$_2$)$_n$—SO$_2$—Z (3b),

—NH—CO—CH(Hal)—CH$_2$—Hal (3c)

or

—NH—CO—C(Hal)=CH$_2$ (3d), and n is the number 2, 3 or 4,

Hal is halogen and

Z is vinyl or a radical —CH$_2$—CH$_2$—U and U is a group removable under alkaline conditions.

The definitions and preferred meanings given above for each of n, Hal and U apply.

The reactive dyes of formulae (1) and (8) contain sulfo groups, which may in each case be present either in the form of the free sulfo acid or, preferably, in the form of a salt thereof, for example in the form of a sodium, lithium, potassium or ammonium salt or in the form of a salt of an organic amine, e.g. in the form of a triethanolammonium salt.

The reactive dyes of formulae (1) and (8) and accordingly the dye mixtures may also comprise further additives, for example sodium chloride or dextrin.

Instead of the dye of formula (1), the dye mixtures according to the invention preferably comprise the above-mentioned mixtures of at least one dye of formulae (1a) and (1b) together with at least one dye of formulae (1c) and (1d), especially a compound of each of formulae (1a), (1b), (1c) and (1d), wherein the definitions and preferred meanings given above for the radicals D$_1$, D$_2$, R$_1$ and R$_2$ in the compounds of formulae (1a), (1b), (1c) and (1d) apply.

The dye of formula (8) in the dye mixture according to the invention is preferably a dye of formula (8a), (8b) or (8c)

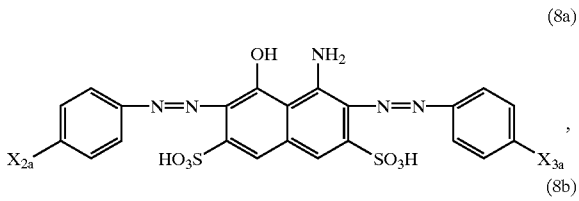
(8a)

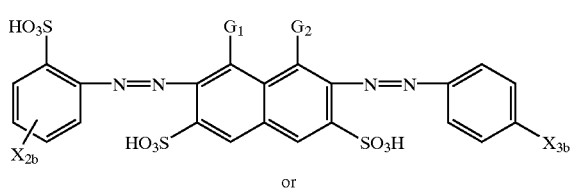
(8b)

or

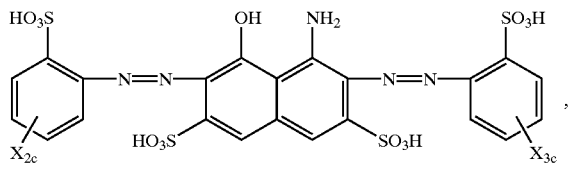
(8c)

especially of formula (8a), wherein one of the substituents G$_1$ and G$_2$ is amino and the other is hydroxy, X$_{2a}$, X$_{3a}$ and X$_{3b}$ are each independently of the others β-sulfatoethylsulfonyl or vinylsulfonyl and X$_{2b}$, X$_{2c}$ and X$_{3c}$ are each independently of the others α,β-dibromopropionylamino or α-bromoacryloylamino.

Especially preferred dye mixtures according to the invention comprise a compound of each of formulae (1a), (1b), (1c) and (1d) together with a dye of formula (8a).

The dye of formula (1) or the dyes of formulae (1a), (1b), (1c) and (1d) are present in the dye mixture according to the invention in a weight ratio with respect to the dye of formula (8) of, for example, from 1:99 to 99:1, preferably from 5:95 to 95:5, and especially from 10:90 to 90:10.

The dye mixtures according to the invention may be prepared, for example, by mixing the individual dyes. The mixing process is carried out, for example, in a suitable mill, e.g. a ball or pin mill, and also in a kneader or mixer.

The dye mixtures according to the invention may comprise, in addition to the reactive dyes mentioned above, further dyes, especially further reactive dyes for shade adjustment.

The dyes and dye mixtures according to the invention are fibre-reactive, that is they are capable of reacting with the hydroxyl groups of cellulose or with the reactive centres of natural and synthetic polyamides, with the formation of covalent chemical bonds.

The reactive dyes according to the invention and the mixtures of reactive dyes according to the invention are suitable for dyeing and printing a wide variety of materials, especially hydroxyl-group-containing or nitrogen-containing fibre materials. Examples include silk, leather, wool, polyamide fibres and polyurethanes, and especially all types of cellulosic fibre materials. Such fibre materials are, for example, natural cellulose fibres, such as cotton, linen and hemp, and cellulose and regenerated cellulose. The dyes and dye mixtures according to the invention are also suitable for dyeing or printing hydroxyl-group-containing fibres contained in blend fabrics, for example blends of cotton and polyester fibres or polyamide fibres.

The dyes and dye mixtures according to the invention can be applied to the fibre material and fixed to the fibre in a number of ways, especially in the form of aqueous dye solutions or dye print pastes. They are suitable for the exhaust process and also for dyeing using the pad-dyeing process, can be used at low dyeing temperatures and require only short steaming times in the pad-steam process. The degrees of fixing are high and unfixed dye can be washed off readily, the difference between the degree of exhaust and the degree of fixing being remarkably small, that is to say the soaping loss is very small. The dyes and dye mixtures according to the invention are also suitable for printing, especially on cotton, but also for printing nitrogen-containing fibres, for example wool or silk or blend fabrics containing wool.

The dyeings and prints produced on cellulose fibre materials using the dyes and dye mixtures according to the invention have a high tinctorial strength and a high fibre-dye binding stability in both acidic and alkaline ranges, and they also have good fastness to light and very good wet-fastness properties, such as fastness to washing, water, seawater, cross-dyeing and to perspiration, as well as good fastness to pleating, to pressing, to rubbing, and especially to chlorine.

The following Examples serve to illustrate the invention. The temperatures are given in degrees Celsius, parts are parts by weight, and the percentages relate to percent by weight, unless otherwise indicated. Parts by weight relate to parts by volume in a ratio of kilograms to liters.

EXAMPLE 1

28.1 parts of an amine of formula $D_{10}$—$NH_2$, wherein $D_{10}$ is a radical of formula

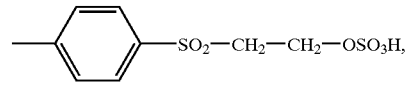

are added to 200 parts of water and stirred thoroughly. At about from 10 to 20° C., 17 parts of concentrated hydrochloric acid are added to the resulting suspension, the mixture is cooled to from 0 to 5° C., and 6.9 parts of sodium nitrite dissolved in 25 parts of water are slowly added dropwise. When the conversion of the amine to the corresponding diazo compound is complete, the excess of nitrite is destroyed by the addition of sulfamic acid.

EXAMPLE 2

36.2 parts of an amine of formula $D_{11}$—$NH_2$, wherein $D_{11}$ is a radical of formula

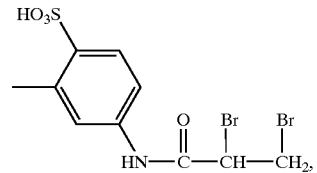

are added to 400 parts of water and stirred thoroughly. At about from 10 to 20° C., 29 parts of concentrated hydrochloric acid are added to the resulting suspension, the mixture is cooled to from 0 to 5° C., and 6.2 parts of sodium nitrite dissolved in 22.5 parts of water are slowly added dropwise. When the conversion of the amine to the corresponding diazo compound is complete, the excess of nitrite is destroyed by the addition of sulfamic acid.

EXAMPLES 3 TO 17

The diazo compounds of the amines given in Table 1 can be prepared analogously to the procedure described in Examples 1 and 2 by using, instead of the amines of formula $D_{10}$—$NH_2$ or $D_{11}$—$NH_2$ mentioned in Example 1 or 2, an equimolar amount of the amines of formula $D_{xy}$—$NH_2$ given in Table 1.

TABLE 1

| Ex. | Amine $D_{xy}$-$NH_2$ | $D_{xy}$ |
|---|---|---|
| 3 | $D_{12}$-$NH_2$ | $D_{11}$ = —⟨phenyl⟩—$SO_2$—$CH_2$—$CH_2$—$OSO_3H$ |

TABLE 1-continued

| Ex. | Amine $D_{xy}$-$NH_2$ | $D_{xy}$ |
|---|---|---|
| 4 | $D_{13}$-$NH_2$ | $D_{13}$ = 2-sulfo-4-(2-sulfatoethylsulfonyl)phenyl: benzene ring with $HO_3S$ at ortho position and $-SO_2-CH_2-CH_2-OSO_3H$ at para position |
| 5 | $D_{14}$-$NH_2$ | $D_{14}$ = benzene ring with $HO_3S$ ortho and $-HC=C(O)-CHBr-CH_2Br$ para |
| 6 | $D_{15}$-$NH_2$ | $D_{15}$ = phenyl-$CONH-(CH_2)_2-SO_2-(CH_2)_2-Cl$ |
| 7 | $D_{16}$-$NH_2$ | $D_{16}$ = benzene with $HO_3S$ ortho and $-CONH-(CH_2)_2-SO_2-(CH_2)_2-Cl$ para |
| 8 | $D_{17}$-$NH_2$ | $D_{17}$ = phenyl-$CONH-(CH_2)_2-SO_2-(CH_2)_2-OSO_3H$ |
| 9 | $D_{18}$-$NH_2$ | $D_{18}$ = benzene with $HO_3S$ ortho and $-CONH-(CH_2)_2-SO_2-(CH_2)_2-OSO_3H$ para |
| 10 | $D_{19}$-$NH_2$ | $D_{19}$ = phenyl with meta $-CONH-(CH_2)_2-SO_2-(CH_2)_2-OSO_3H$ |
| 11 | $D_{20}$-$NH_2$ | $D_{20}$ = benzene with $OCH_3$ ortho and $-SO_2-CH_2-CH_2-OSO_3H$ para |
| 12 | $D_{21}$-$NH_2$ | $D_{21}$ = benzene with $OCH_3$, $CH_3$, and $-SO_2-CH_2-CH_2-OSO_3H$ substituents |
| 13 | $D_{22}$-$NH_2$ | $D_{22}$ = benzene with two $OCH_3$ groups and $-SO_2-CH_2-CH_2-OSO_3H$ |

TABLE 1-continued

| Ex. | Amine $D_{xy}$-NH$_2$ | $D_{xy}$ |
|---|---|---|
| 14 | $D_{23}$-NH$_2$ | $D_{23}$ = 2-methyl-6-(2-sulfatoethylsulfonyl)naphthalene-1-sulfonic acid (naphthalene with SO$_3$H at position 1, CH$_3$ at position 2, and SO$_2$—CH$_2$—CH$_2$—OSO$_3$H at position 6) |
| 15 | $D_{24}$-NH$_2$ | $D_{24}$ = naphthalene with SO$_3$H at position 1, CH$_3$ at position 2, and SO$_2$—CH$_2$—CH$_2$—OSO$_3$H at position 5 |
| 16 | $D_{25}$-NH$_2$ | $D_{25}$ = naphthalene with SO$_2$—CH$_2$—CH$_2$—OSO$_3$H at position 1 and CH$_3$ at position 7 |
| 17 | $D_{25}$-NH$_2$ | $D_{26}$ = naphthalene with SO$_2$—CH$_2$—CH$_2$—OSO$_3$H at position 1, SO$_3$H at position 3, and CH$_3$ at position 6 |
| 18 | $D_{27}$-NH$_2$ | $D_{27}$ = benzene ring with HO$_3$S at one position and —NHCO—(CH$_2$)$_3$—SO$_2$—(CH$_2$)$_2$—Cl |
| 19 | $D_{28}$-NH$_2$ | $D_{28}$ = benzene ring with HO$_3$S and —NHCO—(CH$_2$)$_3$—SO$_2$—(CH$_2$)$_2$—Cl |
| 20 | $D_{29}$-NH$_2$ | $D_{29}$ = benzene with HO$_3$S, SO$_3$H, and —NH— linked to a chlorotriazine bearing —N(CH$_2$CH$_2$OH)(CH$_2$CH$_3$) |
| 21 | $D_{30}$-NH$_2$ | $D_{30}$ = benzene with HO$_3$S and —NH— linked to a chlorotriazine bearing —N(CH$_2$CH$_2$OH)(CH$_2$CH$_3$) |

TABLE 1-continued

| Ex. | Amine $D_{xy}$-NH$_2$ | $D_{xy}$ |
|---|---|---|
| 22 | $D_{31}$-NH$_2$ | $D_{31}$ = 2-HO$_3$S, 5-[(4-chloro-6-(2-sulfoethylamino)-1,3,5-triazin-2-yl)amino]phenyl (as drawn) |
| 23 | $D_{32}$-NH$_2$ | $D_{32}$ = 2-HO$_3$S, 5-[(4-amino-6-chloro-1,3,5-triazin-2-yl)amino]phenyl (as drawn) |
| 24 | $D_{33}$-NH$_2$ | $D_{33}$ = 2-HO$_3$S, 5-[(4-chloro-6-{[4-(2-sulfatoethylsulfonyl)phenyl]amino}-1,3,5-triazin-2-yl)amino]phenyl (as drawn) |
| 25 | $D_{34}$-NH$_2$ | $D_{34}$ = 2-HO$_3$S, 4-(SO$_2$-CH$_2$-CH$_2$-OSO$_3$H)phenyl (as drawn) |

EXAMPLE 26

A solution of 21.5 parts of 2-amino-5-naphthol-7-sulfonic acid in 250 parts of water (pH 7) are added dropwise, at from 0 to 5° C., to the acidic suspension of the diazo compound obtained according to Example 1. The mixture is allowed to warm up to room temperature and is stirred for about 5 hours until coupling is complete (first coupling). The reaction mixture is then cooled to from 5 to 10° C., the pH value is raised to about 4.5 using aqueous sodium hydrogen carbonate solution and the suspension of diazo compound obtained according to Example 2 is slowly added dropwise, the pH value being maintained at about 4.5 during the dropwise addition by the addition of aqueous sodium hydrogen carbonate solution and the temperature being maintained at about 5° C. After the dropwise addition, the pH value is adjusted to 6 (second coupling). When coupling is complete, the dye solution is freed of salt by dialysis and concentrated by evaporation in vacuo to obtain a compound that in the form of the free acid corresponds to formula (101)

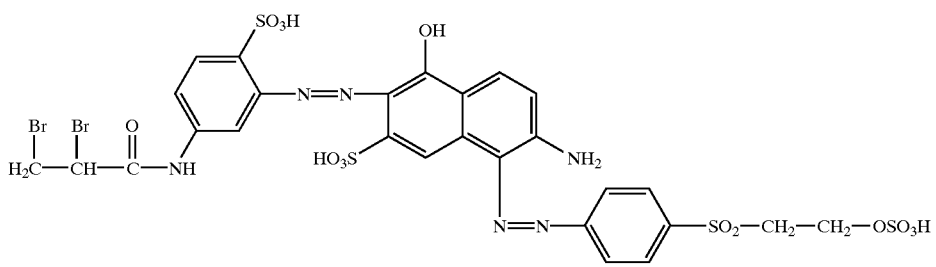

(101)

and dyes cellulose a scarlet shade with good allround properties.

EXAMPLE 27

Following a procedure analogous to that described in Example 26 but using, for the second coupling, an equimolar amount of the diazotised amine according to Example 1 instead of the diazotised amine according to Example 2, there is obtained a compound that in the form of the free acid corresponds to formula (102)

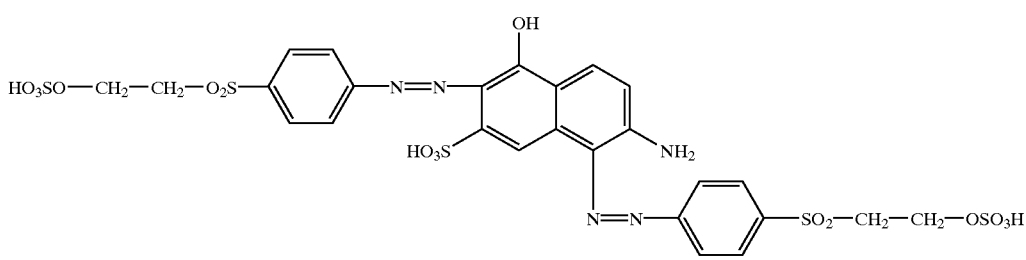

(102)

and dyes cellulose a scarlet shade with good allround properties.

EXAMPLES 28 TO 86

From the diazo compounds described in Examples 1 to 25 there can be prepared, analogously to the procedure described in Example 26 or 27, dyes of the following general formula

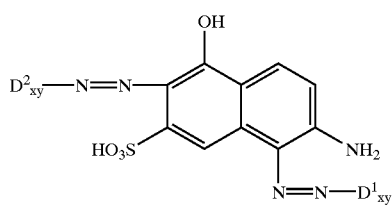

wherein $D^1_{xy}$ and $D^2_{xy}$ correspond to the particular radicals set out in Table 2 and those radicals are as defined in Table 1. The dyes dye cellulose the shades given in Table 2 with good allround properties.

TABLE 2

| Ex. | $D^1_{xy}$ first coupling | $D^2_{xy}$ second coupling | Shade |
|---|---|---|---|
| 28 | D11 | $D_{11}$ | scarlet |
| 29 | $D_{12}$ | $D_{12}$ | scarlet |
| 30 | $D_{13}$ | $D_{13}$ | scarlet |
| 31 | $D_{14}$ | $D_{14}$ | scarlet |
| 32 | $D_{15}$ | $D_{15}$ | scarlet |

TABLE 2-continued

| Ex. | $D^1_{xy}$ first coupling | $D^2_{xy}$ second coupling | Shade |
|---|---|---|---|
| 33 | $D_{16}$ | $D_{16}$ | scarlet |
| 34 | $D_{17}$ | $D_{17}$ | scarlet |
| 35 | $D_{18}$ | $D_{18}$ | scarlet |
| 36 | $D_{19}$ | $D_{19}$ | scarlet |
| 37 | $D_{20}$ | $D_{20}$ | scarlet |
| 38 | $D_{21}$ | $D_{21}$ | scarlet |
| 39 | $D_{22}$ | $D_{22}$ | scarlet |
| 40 | $D_{23}$ | $D_{23}$ | scarlet |
| 41 | $D_{24}$ | $D_{24}$ | scarlet |
| 42 | $D_{25}$ | $D_{25}$ | scarlet |
| 43 | $D_{26}$ | $D_{26}$ | scarlet |
| 44 | $D_{10}$ | $D_{12}$ | scarlet |
| 45 | $D_{12}$ | $D_{10}$ | scarlet |
| 46 | $D_{10}$ | $D_{13}$ | scarlet |
| 47 | $D_{13}$ | $D_{10}$ | scarlet |
| 48 | $D_{10}$ | $D_{20}$ | scarlet |
| 49 | $D_{13}$ | $D_{21}$ | scarlet |
| 50 | $D_{21}$ | $D_{13}$ | scarlet |
| 51 | $D_{10}$ | $D_{14}$ | scarlet |
| 52 | $D_{10}$ | $D_{15}$ | scarlet |
| 53 | $D_{10}$ | $D_{16}$ | scarlet |
| 54 | $D_{10}$ | $D_{17}$ | scarlet |
| 55 | $D_{10}$ | $D_{18}$ | scarlet |
| 56 | $D_{10}$ | $D_{19}$ | scarlet |
| 57 | $D_{10}$ | $D_{21}$ | scarlet |
| 58 | $D_{10}$ | $D_{22}$ | scarlet |
| 59 | $D_{10}$ | $D_{23}$ | scarlet |
| 60 | $D_{10}$ | $D_{24}$ | scarlet |

TABLE 2-continued

| Ex. | $D^1_{xy}$ first coupling | $D^2_{xy}$ second coupling | Shade |
|---|---|---|---|
| 61 | $D_{10}$ | $D_{25}$ | scarlet |
| 62 | $D_{10}$ | $D_{26}$ | scarlet |
| 63 | $D_{13}$ | $D_{20}$ | scarlet |
| 64 | $D_{13}$ | $D_{22}$ | scarlet |
| 65 | $D_{14}$ | $D_{11}$ | scarlet |
| 66 | $D_{29}$ | $D_{32}$ | scarlet |
| 67 | $D_{29}$ | $D_{30}$ | scarlet |
| 68 | $D_{29}$ | $D_{10}$ | scarlet |
| 69 | $D_{29}$ | $D_{31}$ | scarlet |
| 70 | $D_{33}$ | $D_{33}$ | scarlet |
| 71 | $D_{28}$ | $D_{28}$ | scarlet |
| 72 | $D_{28}$ | $D_{27}$ | scarlet |
| 73 | $D_{10}$ | $D_{29}$ | scarlet |
| 74 | $D_{10}$ | $D_{31}$ | scarlet |
| 75 | $D_{11}$ | $D_{31}$ | scarlet |
| 76 | $D_{31}$ | $D_{11}$ | scarlet |
| 77 | $D_{33}$ | $D_{11}$ | scarlet |
| 78 | $D_{34}$ | $D_{34}$ | scarlet |
| 79 | $D_{21}$ | $D_{34}$ | scarlet |
| 80 | $D_{34}$ | $D_{21}$ | scarlet |
| 81 | $D_{34}$ | $D_{10}$ | scarlet |
| 82 | $D_{10}$ | $D_{34}$ | scarlet |
| 83 | $D_{31}$ | $D_{31}$ | scarlet |
| 84 | $D_{10}$ | $D_{33}$ | scarlet |
| 55 | $D_{13}$ | $D_{32}$ | scarlet |
| 86 | $D_{19}$ | $D_{21}$ | scarlet |

EXAMPLE 87

A mixture of 14.1 parts of an amine of formula $D_{10}$—$NH_2$ and 18.1 parts of an amine of formula $D_{13}$—$NH_2$, wherein $D_{10}$ and $D_{13}$ are as defined in Example 1 and in Table 1, respectively, is added to 200 parts of water and stirred thoroughly. At about from 10 to 20° C., 17 parts of concentrated hydrochloric acid are added to the resulting suspension, the mixture is cooled to from 0 to 5° C., and 6.9 parts of sodium nitrite dissolved in 25 parts of water are slowly added dropwise. When the conversion of the amines to the corresponding diazo compounds is complete, the excess of nitrite is destroyed by the addition of sulfamic acid.

EXAMPLE 88

A solution of 21.5 parts of 2-amino-5-naphthol-7-sulfonic acid in 250 parts of water (pH 7) is added dropwise, at from 0 to 5° C., to the acidic suspension of the diazo compounds obtained according to Example 87. The mixture is allowed to warm up to room temperature and is stirred for about 5 hours until coupling is complete. The reaction mixture is then cooled to from 5 to 10° C., the pH value is raised to about 4.5 using aqueous sodium hydrogen carbonate solution and the suspension of diazo compounds obtained according to Example 87 is again slowly added dropwise, the pH being maintained at about 4.5 during the dropwise addition by the addition of aqueous sodium hydrogen carbonate solution and the temperature being maintained at about 5° C. After the dropwise addition, the pH value is adjusted to 6. When coupling is complete, the dye solution is freed of salt by dialysis and concentrated by evaporation in vacuo to obtain a mixture of compounds that in the form of their free acids correspond to formulae (103), (104), (105)

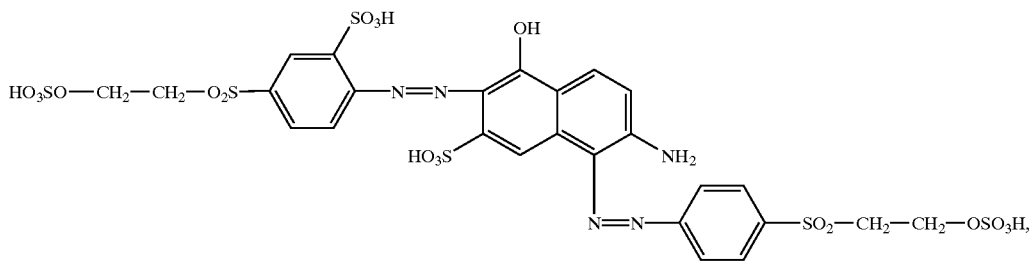

(103)

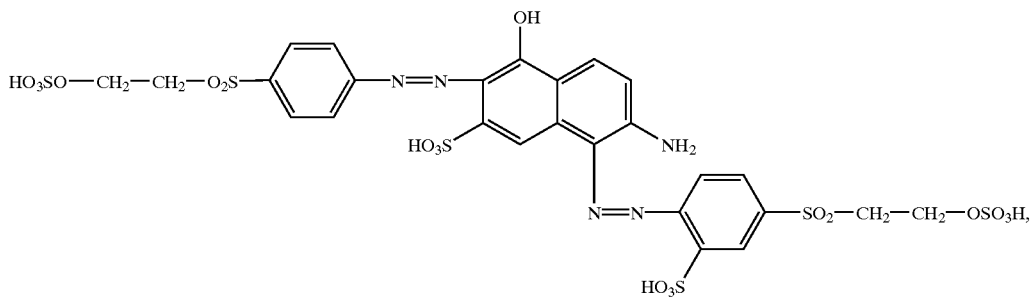

(104)

-continued

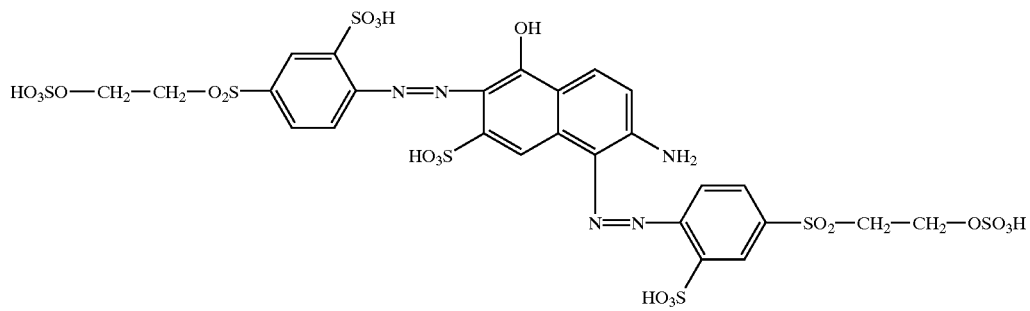

(105)

and (102) and dye cellulose a scarlet shade with good allround properties.

EXAMPLES 89 TO 123

From 1:1 molar mixtures of, in each case, two different amines of formulae $D^1{}_{xy}$—$NH_2$ and $D^2{}_{xy}$—$NH_2$ there can be prepared, analogously to the procedure described in Example 87, the corresponding diazo compounds and from those diazo compounds there can be obtained, analogously to the procedure described in Example 88, mixtures of dyes of the following general formulae wherein $D^1{}_{xy}$ and $D^2{}_{xy}$ correspond to the radicals listed in each case in Table 3, those radicals being as defined in Table 1. The dyes dye cellulose the shades given in Table 3 with good allround properties.

TABLE 3

| Ex. | $D^1{}_{xy}$ | $D^2{}_{xy}$ | Shade |
|-----|------|------|---------|
| 89  | $D_{10}$ | $D_{12}$ | scarlet |
| 90  | $D_{10}$ | $D_{14}$ | scarlet |
| 91  | $D_{10}$ | $D_{15}$ | scarlet |
| 92  | $D_{10}$ | $D_{16}$ | scarlet |
| 93  | $D_{10}$ | $D_{17}$ | scarlet |
| 94  | $D_{10}$ | $D_{18}$ | scarlet |
| 95  | $D_{10}$ | $D_{19}$ | scarlet |
| 96  | $D_{10}$ | $D_{20}$ | scarlet |
| 97  | $D_{10}$ | $D_{21}$ | scarlet |
| 98  | $D_{10}$ | $D_{22}$ | scarlet |
| 99  | $D_{10}$ | $D_{23}$ | scarlet |
| 100 | $D_{10}$ | $D_{24}$ | scarlet |
| 101 | $D_{10}$ | $D_{25}$ | scarlet |
| 102 | $D_{10}$ | $D_{26}$ | scarlet |
| 103 | $D_{11}$ | $D_{12}$ | scarlet |
| 104 | $D_{11}$ | $D_{13}$ | scarlet |
| 105 | $D_{11}$ | $D_{14}$ | scarlet |
| 106 | $D_{11}$ | $D_{19}$ | scarlet |
| 107 | $D_{11}$ | $D_{20}$ | scarlet |
| 108 | $D_{12}$ | $D_{13}$ | scarlet |
| 109 | $D_{12}$ | $D_{23}$ | scarlet |
| 110 | $D_{13}$ | $D_{14}$ | scarlet |
| 111 | $D_{13}$ | $D_{19}$ | scarlet |
| 112 | $D_{13}$ | $D_{20}$ | scarlet |
| 113 | $D_{13}$ | $D_{21}$ | scarlet |
| 114 | $D_{13}$ | $D_{22}$ | scarlet |
| 115 | $D_{14}$ | $D_{17}$ | scarlet |
| 116 | $D_{14}$ | $D_{18}$ | scarlet |
| 117 | $D_{14}$ | $D_{19}$ | scarlet |
| 118 | $D_{14}$ | $D_{20}$ | scarlet |
| 119 | $D_{14}$ | $D_{21}$ | scarlet |
| 120 | $D_{14}$ | $D_{23}$ | scarlet |
| 121 | $D_{14}$ | $D_{24}$ | scarlet |
| 122 | $D_{17}$ | $D_{19}$ | scarlet |
| 123 | $D_{18}$ | $D_{19}$ | scarlet |

DYEING EXAMPLE 124

100 parts of cotton fabric are placed in a dye bath at a temperature of 30° C. containing 0.75 part of the dye mixture according to Example 88, 0.75 part of the dye of formula (106)

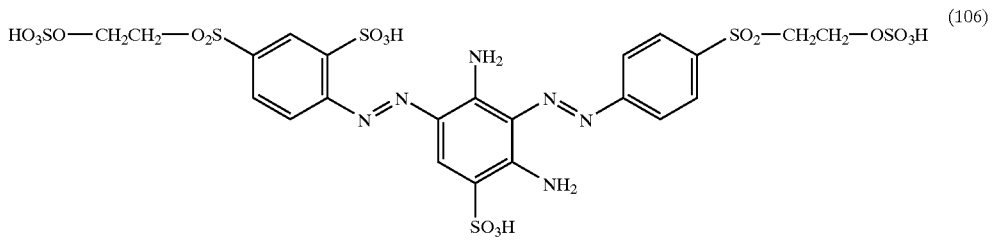

and 3.5 parts of the dye of formula (107)

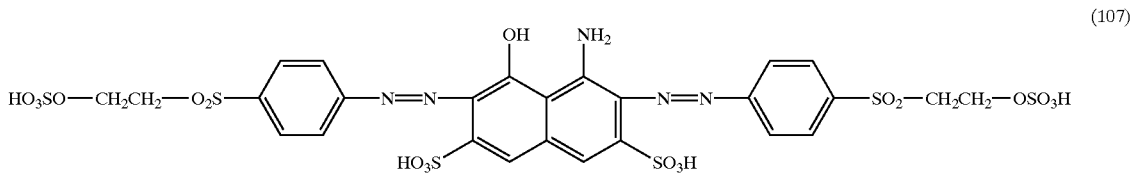

and 30 parts of sodium chloride in 1000 parts of water. The temperature of the dyebath is raised to 90° C. over a period of 30 minutes and maintained for a further 45 minutes. The temperature is then reduced to 70° C. over a period of about 15 minutes, 15 parts of calcined soda are added and the temperature of the dyebath is maintained at 70° C. for a further 45 minutes. The dyed fabric is then, in customary manner, rinsed and dried. A cotton fabric dyed black is obtained, which has good allround properties.

Dyeing Procedure I 2 parts of the dye obtained according to Example 26 are dissolved in 400 parts of water; 1500 parts of a solution containing 53 g of sodium chloride per liter are added. 100 parts of cotton fabric are placed in the dyebath at 40° C. After 45 minutes, 100 parts of a solution containing 16 g of sodium hydroxide and 20 g of calcined soda per liter are added. The temperature of the dyebath is maintained at 40° C. for a further 45 minutes. The dyed goods are then rinsed, soaped at the boil for a quarter of an hour with a non-ionic detergent, rinsed again and dried.

Dyeing Procedure II 2 parts of the reactive dye obtained according to Example 26 are dissolved in 400 parts of water; 1500 parts of a solution containing 53 g of sodium chloride per liter are added. 100 parts of cotton fabric are placed in the dyebath at 35° C. After 20 minutes, 100 parts of a solution containing 16 g of sodium hydroxide and 20 g of calcined soda per liter are added. The temperature of the dyebath is maintained at 35° C. for a further 15 minutes. The temperature is then raised to 60° C. over a period of 20 minutes. The temperature is maintained at 60° C. for a further 35 minutes. Rinsing is then carried out, followed by soaping at the boil for a quarter of an hour with a non-ionic detergent, rinsing again and drying.

Dyeing Procedure III 8 parts of the reactive dye obtained according to Example 26 are dissolved in 400 parts of water; 1400 parts of a solution containing 100 g of sodium sulfate per liter are added. 100 parts of cotton fabric are placed in the dyebath at 25° C. After 10 minutes, 200 parts of a solution containing 150 g of trisodium phosphate per liter are added. The temperature of the dyebath is then raised to 60° C. over a period of 10 minutes. The temperature is maintained at 60° C. for a further 90 minutes. Rinsing is then carried out, followed by soaping at the boil for a quarter of an hour with a non-ionic detergent, rinsing again and drying.

Dyeing Procedure IV 4 parts of the reactive dye obtained according to Example 26 are dissolved in 50 parts of water. 50 parts of a solution containing 5 g of sodium hydroxide and 20 g of calcined soda per liter are added. A cotton fabric is pad-dyed with the resulting solution to a weight gain of 70%, and is then wound onto a roll. The cotton fabric is stored in that form for 3 hours at room temperature. The dyed goods are then rinsed, soaped at the boil for a quarter of an hour with a non-ionic detergent, rinsed again and dried.

Dyeing Procedure V 6 parts of the reactive dye obtained according to Example 26 are dissolved in 50 parts of water. 50 parts of a solution containing 16 g of sodium hydroxide and 0.04 liter of water glass (38°bé) per liter are added. A cotton fabric is pad-dyed with the resulting solution to a weight gain of 70%, and is then wound onto a roll. The cotton fabric is stored in that form for 10 hours at room temperature. The dyed goods are then rinsed, soaped at the boil for a quarter of an hour with a non-ionic detergent, rinsed again and dried.

Dyeing Procedure VI 2 parts of the reactive dye obtained according to Example 26 are dissolved in 100 parts of water with the addition of 0.5 part of sodium m-nitrobenzene-sulfonate. A cotton fabric is impregnated with the resulting solution to a weight gain of 75% and is then dried. The fabric is then impregnated with a solution at 20° C. containing 4 g of sodium hydroxide and 300 g of sodium chloride per liter, squeezed off to a 75% weight gain, and the dyeing is steamed for 30 seconds at from 100 to 102° C., rinsed, soaped for a quarter of an hour in a boiling 0.3% solution of a non-ionic detergent, rinsed and dried.

Printing Procedure I

While stirring rapidly, 3 parts of the reactive dye obtained according to Example 26 are sprinkled into 100 parts of a stock thickener containing 50 parts of 5% sodium alginate thickener, 27.8 parts of water, 20 parts of urea, 1 part of sodium m-nitrobenzenesulfonate and 1.2 parts of sodium hydrogen carbonate. The print paste so obtained is used to print a cotton fabric; drying is carried out and the resulting printed fabric is steamed in saturated steam at 102° C. for 2 minutes. The printed fabric is then rinsed, optionally soaped at the boil and rinsed again, and then dried.

Printing Procedure II

While stirring rapidly, 5 parts of the reactive dye obtained according to Example 26 are sprinkled into 100 parts of a stock thickener containing 50 parts of 5% sodium alginate thickener, 36.5 parts of water, 10 parts of urea, 1 part of sodium m-nitrobenzenesulfonate and 2.5 parts of sodium hydrogen carbonate. The print paste so obtained, the stability of which meets the technical requirements, is used to print a cotton fabric; drying is carried out and the resulting printed fabric is steamed in saturated steam at 102° C. for 8 minutes. The printed fabric is then rinsed, optionally soaped at the boil and rinsed again, and then dried.

What is claimed is:

1. A dye mixture comprising at least one dye of formula

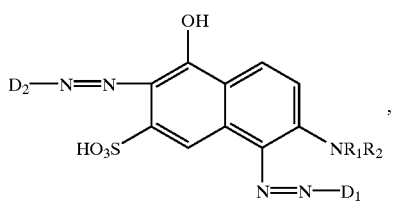
(1)

wherein $R_1$ and $R_2$ are each independently of the other hydrogen or $C_1$–$C_4$alkyl, and $D_1$ and $D_2$ are each independently of the other a radical of formula (2)

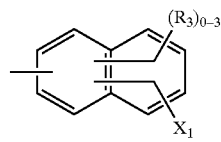
(2)

wherein $(R_3)_{0-3}$ denotes from 0 to 3 identical or different substituents selected from the group consisting of halogen, $C_1$–$C_4$alkyl, $C_1$–$C_4$alkoxy, carboxy, nitro and sulfo, and $X_1$ is a radical of formula (3a), (3b), (3c), (3d), (3e) or (3f)

—SO$_2$—Z (3a),

—NH—CO—(CH$_2$)$_m$—SO$_2$—Z (3b),

—CONH—(CH$_2$)$_n$—SO$_2$—Z (3c),

—NH—CO—CH(Hal)-CH$_2$-Hal (3d),

—NH—CO—C(Hal)=CH$_2$ (3e) or

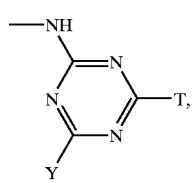
(3f)

wherein

Y is halogen, T independently thereof has a meaning given for Y or is a non-fibre-reactive substituent or is a fibre-reactive radical of formula (4a), (4b), (4c), (4d) or (4e)

—NH—(CH$_2$)$_{2-3}$—SO$_2$—Z (4a),

—NH—(CH$_2$)$_{2-3}$—O—(CH$_2$)$_{2-3}$—SO$_2$—Z (4b),

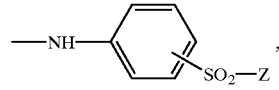
(4c)

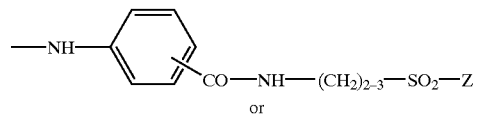
or
(4d)

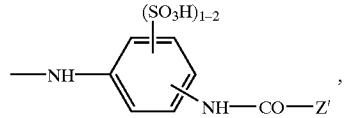
(4e)

wherein

Z is vinyl or a radical —CH$_2$—CH$_2$—U and U is a group removable under alkaline conditions, Z' is a group —CH(Hal)-CH$_2$-Hal or —C(Hal)=CH$_2$, m and n are each independently of the other the number 2, 3 or 4, and Hal is halogen, together with at least one dye of formula (8)

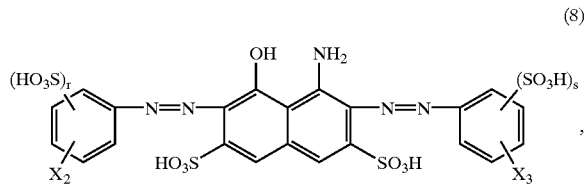
(8)

wherein r and s are each independently of the other the number 0 or 1, and $X_2$ and $X_3$ are each independently of the other a radical of formula (3a), (3b), (3c) or (3d) as given above.

2. A dye mixture according to claim 1, wherein $R_1$ and $R_2$ are hydrogen.

3. A dye mixture according to claim 1, wherein U is —Cl, —Br, —F, —OSO$_3$H, —SSO$_3$H, —OCO—CH$_3$, —OPO$_3$H$_2$, —OCO—C$_6$H$_5$, —OSO$_2$—C$_1$–C$_4$alkyl or —OSO$_2$—N(C$_1$–C$_4$alkyl)$_2$.

4. A dye mixture according to claim 1, wherein U is —Cl or —OSO$_3$H.

5. A dye mixture according to claim 1, wherein $D_1$ and $D_2$ are each independently of the other a radical of formula (2a), (2b), (2c), (2d) or (2e)

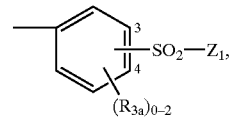
(2a)

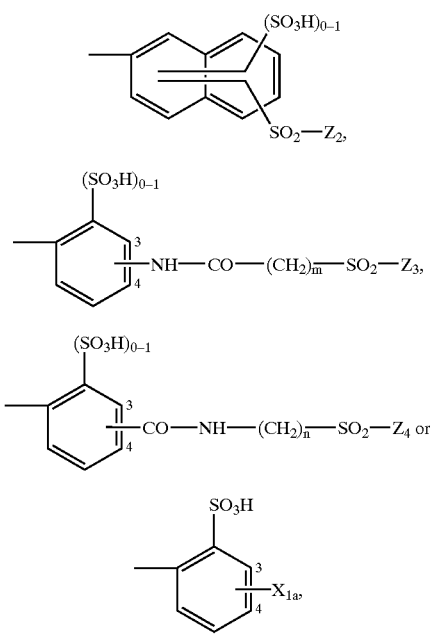

wherein $(R_{3a})_{0-2}$ denotes from 0 to 2 identical or different substituents selected from the group consisting of halogen, $C_1$–$C_4$alkyl, $C_1$–$C_4$alkoxy and sulfo, $X_{1a}$ is α,β-dibromopropionylamino or α-bromoacryloylamino, m and n are each independently of the other the number 2 or 3, and $Z_1$, $Z_2$, $Z_3$ and $Z_4$ are each independently of the others vinyl, β-chloroethyl or β-sulfatoethyl.

6. A dye mixture according to claim 1 comprising as the dye of formula (8) a dye of formula (8a), (8b) or (8c)

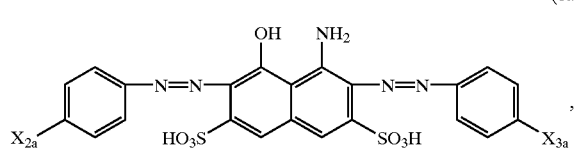

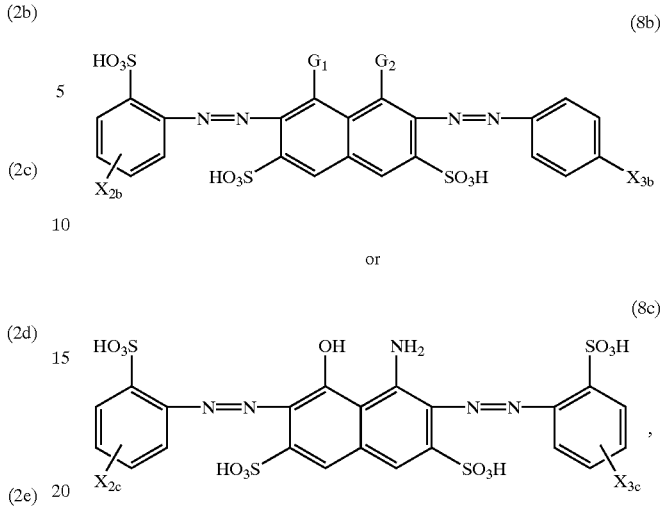

wherein one of the substituents $G_1$ and $G_2$ is amino and the other is hydroxy, $X_{2a}$, $X_{3a}$ and $X_{3b}$ are each independently of the others β-sulfatoethylsulfonyl or vinylsulfonyl and $X_{2b}$, $X_{2c}$ and $X_{3c}$ are each independently of the others α,β-dibromopropionylamino or α-bromoacryloylamino.

7. A dye mixture according to claim 6 comprising a dye of formula (8a).

8. A method for the dyeing or printing of hydroxyl-group-containing or nitrogen-containing fibre materials which comprises contacting said materials with a tinctorially effective amount of a dye mixture according to claim 1.

9. A method according to claim 8, wherein cellulosic fibre materials are dyed or printed.

10. A method according to claim 8, wherein cotton-containing fibre materials are dyed or printed.

* * * * *

UNITED STATES PATENT AND TRADEMARK OFFICE
CERTIFICATE OF CORRECTION

PATENT NO.         : 6,537,332 B1
APPLICATION NO.    : 09/744487
DATED              : March 25, 2003
INVENTOR(S)        : Athannassios Tzikas and Herbert Klier It is certified that error appears in the above-identified patent and that said Letters Patent is hereby corrected as shown below:

Page 1, Abstract, the radical of formula (2) should appear as follows:

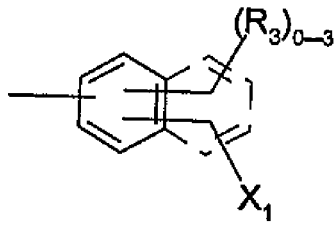

Column 1, line 55, the radical of formula (2) should appear as follows:

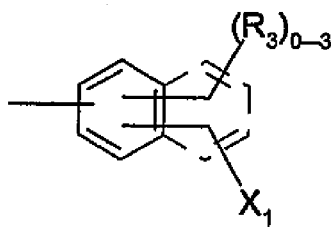

Claim 1, Column 25, line 35, the radical of formula (2) should appears as follows:

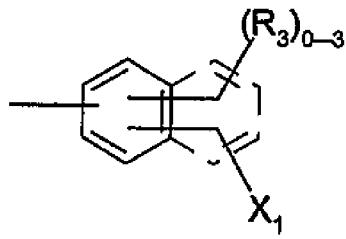

Signed and Sealed this

Fifth Day of June, 2007

JON W. DUDAS
*Director of the United States Patent and Trademark Office*